US008634945B2

(12) United States Patent
Phelippeau et al.

(10) Patent No.: US 8,634,945 B2
(45) Date of Patent: Jan. 21, 2014

(54) DEVICE FOR GENERATING SOUND MESSAGES WITH INTEGRATED DEFECT DETECTION

(75) Inventors: Jacques Phelippeau, Saulx-Marchais (FR); Célia Ratinaud, Courbevoie (FR)

(73) Assignee: Thales, Neuilly sur Seine (FR)

( * ) Notice: Subject to any disclaimer, the term of this patent is extended or adjusted under 35 U.S.C. 154(b) by 583 days.

(21) Appl. No.: 12/640,378

(22) Filed: Dec. 17, 2009

(65) Prior Publication Data

US 2010/0161089 A1 Jun. 24, 2010

(30) Foreign Application Priority Data

Dec. 19, 2008 (FR) ..................................... 08 07221

(51) Int. Cl.
*G06F 17/00* (2006.01)

(52) U.S. Cl.
USPC .......................................................... 700/94

(58) Field of Classification Search
USPC .......................................................... 700/94
See application file for complete search history.

(56) References Cited

U.S. PATENT DOCUMENTS 4,622,539 A 11/1986 Bus et al.
6,271,771 B1 * 8/2001 Seitzer et al. .................. 341/50
7,324,003 B2 * 1/2008 Yun .............................. 340/601
7,710,654 B2 * 5/2010 Ashkenazi et al. ........... 359/630
7,941,198 B2 * 5/2011 Richey et al. ................. 455/701
2006/0158245 A1 7/2006 Ishikawa

OTHER PUBLICATIONS

U.S. Appl. No. 12/491,821, filed Jun. 25, 2009.

* cited by examiner

*Primary Examiner* — Andrew C Flanders
(74) *Attorney, Agent, or Firm* — LaRiviere, Grubman & Payne, LLP

(57) ABSTRACT

In an audio device for generating sound messages MSGi, a detection of defects is carried out by the digital superposition, on the samples of audio sequences to be restored Sqi applied as input to a digital analogue conversion audio chain 10-1, of a test signal $Sq_T$ having a spectrum of frequency(frequencies) outside of the spectrum of frequencies of the sound messages, and the application of this test signal $Sq_T$ to the input of a duplicated audio chain 10-2, and in the extraction of a corresponding test signal, at the output of the conversion chain, the characteristics of which are compared with those of the test signal applied as input. This detection principle has notably the advantage of being simple to implement in an integrated manner, allowing the use of such devices in systems for managing alarms, notably for managing alarms in aircraft. The analogue-audio signal Si to be applied to the loudspeaker 3 is constructed at the output of the chain by eliminating the superimposed test signal.

10 Claims, 1 Drawing Sheet

DEVICE FOR GENERATING SOUND MESSAGES WITH INTEGRATED DEFECT DETECTION

PRIORITY CLAIM

This application claims priority to French Patent Application Number 08 07221, entitled Device For Generating Sound Messages With Integrated Defect Detection, filed Dec. 19, 2008.

DOMAIN OF THE INVENTION

The field of the invention is the verification of the integrity of an audio sound generation chain. The invention applies notably to the verification in operational mode of the integrity of sound-announcement devices used by a system for managing alarms aboard an aircraft.

The general function of the alarm management systems aboard aircraft is to transmit fault messages or to deliver information of importance to the pilot. These systems are very critical in terms of safety. It is necessary not only to be certain that the message is actually emitted, but it is also necessary to be sure that the pilot will indeed take it into account.

With this aim, it has been sought to integrate audio generation devices into these alarm management systems, making it possible to announce alarms and/or information of importance, to the pilot, explicitly by way of voice or sound messages, as a supplement to the displays, telltale lights or other luminous indicators customarily used.

TECHNICAL BACKGROUND

An audio generation device allows restoral of the analogue audio signal of a digital sound sequence. It uses a bank of digital samples of sounds, and an audio conversion chain, capable of delivering, to a loudspeaker, an analogue audio signal corresponding to a determined sequence of digital samples of the bank, which corresponds to a voice or sound message to be emitted.

Such a device is schematically represented in FIG. 1. It comprises a control circuit 1, which receives the requests to emit sound messages, a data bank 2 containing digital samples Dj and a digital analogue conversion audio chain which delivers an analogue audio signal Si to a loudspeaker 3.

On receipt of a control signal CG(MSGi) instructing audio generation of a determined message MSGi, the control circuit 1 establishes the series Sqi of digital samples Dj corresponding to this message MSGi, activates the audio chain 10, typically by means of an activation signal EN, and supplies this audio chain with the series of samples Sqi, at the working frequency of the converter, typically equal to the sampling frequency.

The audio chain 10 provides as output an analogue signal Si, to the loudspeaker 3 which delivers the requested message.

The bank of samples can comprise samples of sound sequences constructed digitally, corresponding for example to sound beeps (mono or multi-frequency digital generators), or obtained by digital sampling at an appropriate frequency, of a recorded audio analogue signal. Typically, a sampling at a frequency of the order of 16 kilohertz and an amplitude coding on 16 bits are suitable for the envisaged application.

The digital analogue conversion chain typically comprises a digital analogue converter 11 and an analogue adaptor 12, typically an audio amplifying filter. By nature, the sound messages restored have variable characteristics (frequencies, amplitudes, durations).

In practice the digital circuitry (circuits 1, 2, 11) operates at the same tempo as a clock signal CK. The frequency of this clock signal corresponds in practice to the sampling frequency of the samples Dj, i.e. typically 16 KHz, in the case of the above example for instance.

In an aircraft, the use of an audio generation device (or of several) by the alarm management system in order to make voice announcements to the pilot, for example a fault detection announcement, or aircraft altitude announcements in the descent phases, is advantageous in that it allows the pilot to concentrate on pure piloting, and that he is capable of reacting immediately and directly, to the announcement of such or such a message, by corresponding piloting actions.

Such a use relating to the management of alarms nevertheless assumes that the integrity of these audio generation devices can be guaranteed. It must be possible to guarantee this integrity at any moment. It must notably be possible to continuously verify proper operation of the function for applying a sequence of samples as input to the digital analogue converter, on activation of a corresponding control signal by the system for generating the alarms and the proper operation of the whole of the conversion chain, namely the digital analogue converter and the amplifier.

More particularly, the usual faults to be detected are an erroneous working frequency, for supplying the converter with samples, or the decoding operation in the converter, which would be manifested through an error in the spectrum of frequencies of the analogue signal restored at output, or errors of amplitude decoding in the converter or errors of analogue adaptation in the amplifier, which would be manifested through an error in the amplitude of the analogue signal restored at output.

Depending on the degree of reliability sought, other errors have to be detected, such as the unexpected emission of sound announcements, that is to say outside of any instruction from the system for generating alarms, corresponding for example to the noise generated by a defective amplifier, or the non-emission of a sound announcement, although it has been instructed.

However, sound messages being diverse, the characteristics of the analogue signal delivered at the output of the conversion chain are variable, unpredictable, both as regards amplitudes, and frequencies, or durations.

Hence, the design of an integrity monitoring system for such a device, which would be based on an analysis of the analogue signal at output, is not easy.

SUMMARY OF THE INVENTION

The subject of the invention is a device for generating sound messages with integrated detection of defects, which makes it possible to respond to this requirement in a reliable, simple and inexpensive manner.

The defects detection principle on which the invention is based consists in the digital superposition, on the input of the digital analogue converter receiving the samples of the audio sequences to be restored, of a digital test signal having a spectrum of frequency(frequencies) outside of the spectrum of frequencies of the audio sequences of the data bank, and in an extraction of a corresponding test signal, at the output of the conversion chain, the characteristics of which are compared with those of the test signal applied as input. This detection principle has notably the advantage of being simple to implement in an integrated manner, in an audio generation device.

The invention therefore relates to a device for generating sound messages, comprising a first digital analogue conversion audio chain for providing an audio signal to a loudspeaker, the said chain being activated by a monitoring circuit on receipt of a control signal for instructing emission of a sound message, so as to convert a sequence of digital samples corresponding to the said sound message. It comprises an integrated device for detecting faults comprising means for superimposing, at the input of the said audio chain, a test signal whose spectrum of frequency(frequencies) is chosen outside of the spectrum of frequencies of the sound messages to be emitted, the said test signal being furthermore applied as input to a second audio chain identical to the first audio chain, means for adding together the respective outputs of the two audio chains, and extracting an output test signal, and means for comparing the characteristics of the said test signal applied as input and of the said output test signal.

Notably, the detection of operating defects of the device is carried out by comparing the characteristics of the test signal extracted at output, with those of the test signal applied as input. It makes it possible notably to detect errors of frequency and errors of amplitude conversion or adaptation in the conversion chain.

Preferably, the circuit for detecting defects is able to perform a correlation of the test signal extracted with a signal representative of the audio emission phases requested. In this way, the device is capable of detecting an unexpected emission of an audio sequence, that is to say outside of any instruction from the system for generating alarms, or else the non-emission of a sound sequence which has been instructed.

According to another aspect of the invention, the analogue signal corresponding to the sound message requested, without the test component, is easily recovered at output by applying the test signal as a common mode signal of an output transformer. The loudspeaker is then typically connected between the two ends of the secondary winding of the output transformer.

The invention applies notably to a system for managing alarms, in particular systems aboard aircraft, for vocally announcing alarms and/or information.

The invention also relates to a method for detecting defects in an audio generation device.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention.

Accordingly, the drawings and description thereof are to be regarded as illustrative in nature, and not as restrictive.

Figure 2:
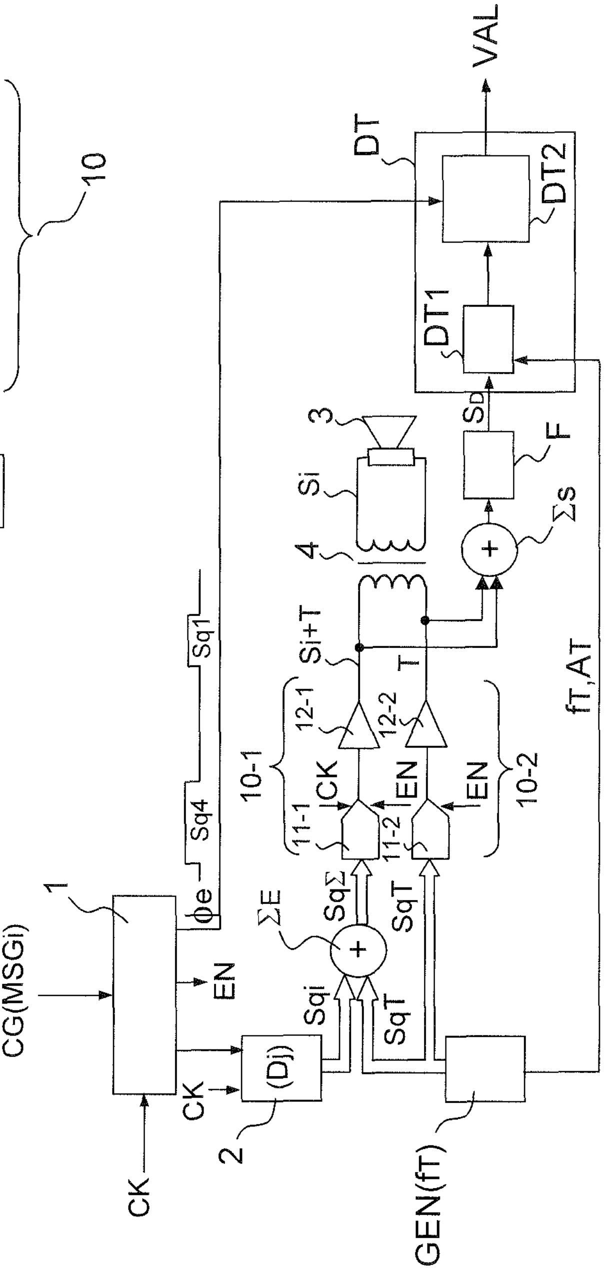
FIG. 2 represents a simplified diagram of a device for generating sound messages with integrated detection of defects, in accordance with the invention.

A device for generating sound messages with integrated detection of defects is represented in a schematic manner in FIG. 2.

Figure 1:
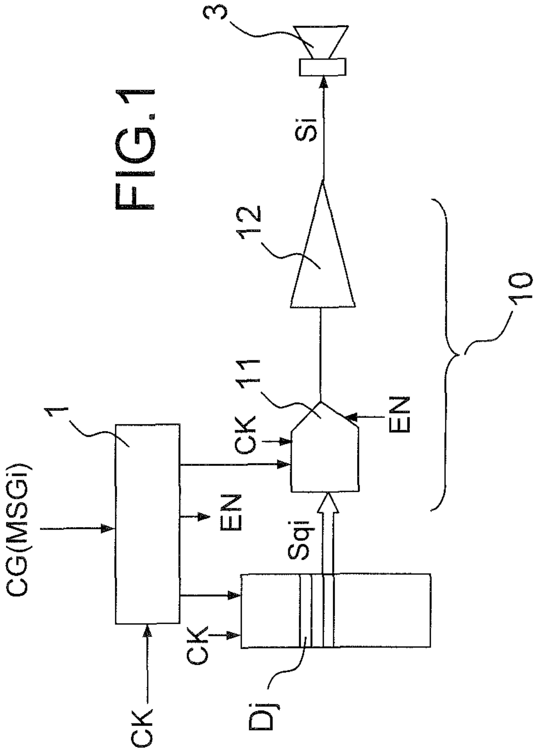
FIG. 1 already described, represents a simplified diagram of a device for generating sound messages according to the state of the art.

It comprises a device for generating sound messages in accordance with the device of FIG. 1, comprising

- a monitoring circuit 1 for instructing emission of a sound message MSGi, on receipt of a corresponding control signal CG(MSGi);
- a bank 2 of digital audio samples Dj, making it possible to construct the sequence of samples corresponding to a sound message to be emitted;
- a digital analogue conversion audio chain 10-1, comprising a digital analogue converter 11-1, followed by an audio adaptor 12-1, typically an amplifying filter, delivering an analogue audio signal Si corresponding to a digital signal Sqi applied as input to the converter, formed by a sequence of samples Dj of the bank 2;
- a loudspeaker 3, receiving the audio signal Si as input.

According to the invention, it furthermore comprises means allowing integrated detection of defects. These means comprise:

- means GEN($f_T$) for generating or providing a digital test signal $Sq_T$, of frequency $f_T$, or of spectrum of frequencies, chosen outside of the audio spectrum of the sound messages to be emitted. These means can be a programmable mono or multi-frequency generator, which has the advantage of rendering the characteristics of the test signal programmable, or a memory containing samples of a periodically repeated, predetermined digital test sequence.
- means $\Sigma_E$, typically a digital adder, receiving as inputs the digital test signal $Sq_T$ and the audio digital signal Sqi corresponding to the sound message MSGi to be emitted, and which provides as output the digital signal $Sq\Sigma$ which is applied as input to the conversion chain 10-1. An analogue signal corresponding to the superposition of the two signals, that may be written in the form Si+T, is obtained at the output of this conversion chain, where Si is the audio signal corresponding to the digital signal Sqi representative of the requested sound message MSGi, and T the test signal corresponding to the digital test signal $Sq_T$ applied as input, the two signals Si and T having separate frequency spectra.
- a second conversion chain 10-2 identical to the conversion chain 10-1, receiving as input the digital test signal $Sq_T$ and providing an output test signal T.
- means $\Sigma_S$ for combining the audio output Si and test output T from the two conversion chains 10-1 and 10-2, typically an analogue adder, and means F, typically a filter matched to the spectrum of frequency(frequencies) of the test signal applied as input, for extracting a test signal $S_D$ therefrom for detection, by eliminating the components of the audio signal Si. During optimal operation, without defects, substantially 2T is thus recovered (disregarding extraction and filtering losses).
- means DT for detecting defects, which provide a binary validity signal VAL, equal to 0 or 1 according to the result of the detection.

The device further comprises means 4 for eliminating the test component T from the output signal of the chain 10-1, so as to recover the audio signal to be applied to the loudspeaker.

These means 4 are preferably a transformer, each end of whose primary winding receives a respective output of a conversion chain, the loudspeaker 3 being connected to the terminals of the secondary winding. In this arrangement, the analogue test signal T is then applied as a common mode signal to the two terminals of the primary winding, so that it is automatically subtracted by the transformer which transmits only the source audio signal Si to the secondary.

In this device, it will be noted that by summing ($\Sigma_S$) the outputs of the two conversion chains 10-1 and 10-2, which are identical, and then by applying a filter F so as to eliminate the audio spectrum of the sound messages to be emitted, a test signal $S_D$ which ought to have characteristics comparable with the test signal $Sq_T$ applied as input is obtained.

Preferably the test signal $Sq_T$ applied as input is monofrequency, of frequency f. For example, it corresponds to an sinusoid of amplitude $A_T$. In this example, the test signal $S_D$ extracted ought to have the same frequency f, with an amplitude of the signal double the amplitude of the signal $Sq_T$ applied as input (ignoring the losses in the extraction chain). The signal carries both the contribution of the audio chain 10-1 and that of the test chain 10-2. These characteristics thus depend on the proper operation of all the elements of the complete audio signal conversion chain 10-1 (adder $\Sigma_E$, converter 11-1, audio adaptor 12-1), the elements for forming the sequence of samples (bank 2, monitoring circuit 1), and the elements of the test signal conversion chain 10-2 (converter 11-2, audio adaptor 12-2).

Thus, the defect detection tied to this test signal SD makes it possible to respond in a simple and satisfactory manner, to the audio generation device's integrity monitoring requirements.

To carry out this defect detection on the signal $S_D$, the detection circuit DT comprises a circuit DT1, for determining whether the characteristics of the test signal applied as input are indeed found again in the test signal extracted at output.

In a practical example, corresponding to a very simple implementation of the invention, the test signal $Sq_T$ applied as input corresponds to a sinusoid of amplitude $A_T$ and of determined frequency $f_T$. The detection circuit DT1 then comprises means for verifying whether the test signal extracted $T_D$ has corresponding amplitude and frequency characteristics, that is to say corresponds substantially to a sinusoidal signal of amplitude equal to $\alpha.2.A_T$ (where $\alpha$ expresses the attenuation of the extraction circuit: the whole signal is not sampled).

It will be noted that, in practice, this detection must be done during the message emission phases, corresponding to emission instructions received by the monitoring circuit, or must be coupled to these emission phases, to interpret the result of the detection. Indeed, outside of any instruction, the conversion chains 10-1 and 10-2 will generally be inactive (signal EN in the inactive state). In these phases, it is therefore normal not to find the test characteristics ($f_T$, $2.A_T$) again.

Thus, the detection circuit DT preferably comprises an additional circuit DT2, making it possible to verify whether the emission sequences of the extracted test signal correspond to sound messages emission phases. This involves verifying whether there are unexpected emissions of sound messages, that is to say outside of the message-emission phases, which may for example correspond to the noise of a defective audio amplifier; and whether there is in fact a message emission, in the emission phases. Indeed, outside of the emission phases, the conversion chains 10-1 and 10-2 are normally not active. Hence in a normal operating mode, there ought not to be any signal at output outside of the emission phases. As soon as the monitoring circuit receives a command instructing emission of a message, it activates the chains, typically through an activation signal EN. In a normal operating mode, during each emission phase, there ought to be a signal at the output of each chain, which the detection circuit DT1 makes it possible to detect. The circuit DT2 therefore makes it possible to correlate the result of the detection made by the circuit DT1 with the operational emission phases.

In an exemplary implementation, there is provision for the monitoring circuit 1 which receives the message emission commands to provide the detection circuit DT2 with an emission phase signal Φe, each pulse of which corresponds to the duration of emission of a requested message: MSG4, MSG1.

Such a phase signal Φe is easily generated by means of logic gates and of a delay circuit for example, to control a rising edge marking the start of an emission phase, for example on receipt of a control signal CG(MSGi), and a falling edge marking the end of the emission phase, for example by a flip-flop coupled to a delay circuit and triggered by the transmission of the last sample Dj of the digital sequence corresponding to the message to be emitted.

Preferably, the test signal is chosen with a frequency below the minimum frequency of the audio spectrum of the sound messages, and the filtering for extracting the test signal for detection $S_D$ is a low-pass (or bandpass) filter. The test signal is preferably a sinusoid, this being simple to detect in terms of amplitude and frequency, and optimal in terms of detection time. The time required for detection is indeed dependent on the frequency characteristics of the test signal and the characteristics of the extraction filter F. But the test signal can be chosen with another waveform, as long as its frequency, or its spectrum of frequencies, lies outside of the spectrum of frequencies of the sound messages to be emitted, allowing its extraction as output, after superposition at the input of the audio conversion chain.

The detection circuit DT which has just been described is a signal detection circuit which does not pose any difficulties of embodiment to the person skilled in the art. It can be embodied by simple digital and/or analogue circuits, and easily integrated, with the other elements (GEN($f_T$), $\Sigma_E$, $\Sigma_S$, F, 4) allowing integrated detection of emission defects.

The invention which has just been described makes it possible to verify, in a simple and effective manner, the integrity of the whole audio chain for generating the messages. In particular, detection is independent of the temporal or amplitude characteristics of the audio signal to be emitted. The output audio signal is disturbed very little or not at all by the extraction of the test signal.

The invention applies advantageously to an aircraft alarm management system, using one or more audio generation devices for the emission of sound messages, and more generally to any system using sound messages to alert and/or inform, if the integrity of the chain for emitting these messages has to be guaranteed It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by the definition contained in the appended claims and equivalent thereof.

The invention claimed is:

1. Device for generating sound messages, comprising:

a. a first digital to analogue conversion system for providing an audio signal to a loudspeaker comprising:

i. a sequence of digital samples corresponding to particular sound messages, the sound messages having a spectrum of emission frequencies;

ii. a control signal that instructs a monitoring circuit to activate an audio chain to emit the particular sound messages;

b. an integrated device for detecting faults comprising:

i. a test signal comprising a spectrum of emission frequencies outside the spectrum of frequencies of the operational sound messages;

ii. a digital adder for superimposing, at the input of the first audio chain, the test signal;

iii. a second audio chain identical to the first audio chain, receiving as input the test signal;

iv. an analog adder for adding together the outputs of the first and second audio chains;

v. a filter applied to the output of the analog adder for extracting an output test signal through filtering of the corresponding frequencies' spectrum of the operational sound messages; and vi. a comparator for comparing the characteristics of the test signal applied as input and of the output test signal.

2. Device according to claim 1, wherein the output test signal is correlated with emission phases of the sound messages.

3. Device according to claim 1, further comprising a transformer, receiving, at the terminals of the primary winding, the output signals of the first and second audio chains and the terminals of whose secondary winding are applied to a loudspeaker.

4. Device according to claim 1, in which the test signal applied as input corresponds to a sinusoid of determined or programmable amplitude and frequency.

5. Device according to claim 1, wherein the test signal applied as input is chosen with a spectrum of frequency (frequencies) below a lower limit frequency of the spectrum of frequencies of the operational sound messages.

6. A system for managing alarms using one or more devices for generating sound messages so as to emit operational messages, wherein the device or devices are devices according to claim 1, with integrated detection of faults.

7. System for managing alarms according to claim 6, applied to the management of the alarms in an onboard flight management system aboard an aircraft.

8. A method for verifying the integrity of a device for generating sound messages, the method comprising:

a. duplicating a sequence of digital audio input samples corresponding to particular sound massages, the sound messages having a spectrum of operational emission frequencies;

b. generating an input test signal comprising a spectrum of emission frequencies outside the spectrum of operational emission frequencies of the sound messages;

c. superimposing the input test signal at the input of a first audio chain;

d. applying the input test signal a second audio chain identical to the first audio chain;

e. adding together respective outputs of the first and second audio chains;

f. extracting an output test signal; and g. comparing the extracted output test signal with the input test signal.

9. Method according to claim 8, further comprising:

a. applying the outputs of the output test signal and the digital audio input samples to terminals of a primary winding of a transformer to eliminate the input test signal at the output of the transformer.

10. Method according to claim 8, wherein the output test signal is correlated with emission phases of the sound messages.

* * * * *